United States Patent
Kumar Reddy et al.

(10) Patent No.: US 8,868,110 B2
(45) Date of Patent: Oct. 21, 2014

(54) WIRELESS COMMUNICATION DEVICE CAPABLE OF EFFICIENT NETWORK SEARCH

(75) Inventors: C. Ashok Kumar Reddy, Bangalore (IN); Abir Mookherjee, Bangalore (IN); Shashidhar Vummintala, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 25 days.

(21) Appl. No.: 13/341,627

(22) Filed: Dec. 30, 2011

(65) Prior Publication Data
US 2013/0130724 A1     May 23, 2013

Related U.S. Application Data

(60) Provisional application No. 61/562,196, filed on Nov. 21, 2011.

(51) Int. Cl.
*H04W 88/02*     (2009.01)
*H04W 36/08*     (2009.01)

(52) U.S. Cl.
CPC .................................. *H04W 36/08* (2013.01)
USPC ..................................................... 455/456.6

(58) Field of Classification Search
USPC ................. 455/456.6, 422.1, 552.1; 370/325
See application file for complete search history.

(56) References Cited

U.S. PATENT DOCUMENTS

| | | | |
|---|---|---|---|
| 8,059,731 B2 * | 11/2011 | Higuchi et al. | 375/260 |
| 8,068,834 B2 * | 11/2011 | Amerga et al. | 455/436 |
| 8,170,548 B2 | 5/2012 | Iwamura et al. | |
| 8,243,839 B2 * | 8/2012 | Higuchi et al. | 375/260 |
| 2007/0237261 A1 | 10/2007 | Lindoff et al. | |
| 2011/0098074 A1 | 4/2011 | Seo et al. | |
| 2012/0034917 A1 * | 2/2012 | Kazmi | 455/434 |

FOREIGN PATENT DOCUMENTS

KR    10-2010-0055435 A     5/2010

OTHER PUBLICATIONS

Office Action directed toward related Korean Patent Application No. KR 10-2012-0102616, dated Mar. 11, 2014, from the Korean Patent Office; 4 pages.
Office Action for Taiwanese Patent Application No. 10320682420, mailed on May 21, 2014.

* cited by examiner

*Primary Examiner* — Diane Mizrahi
(74) *Attorney, Agent, or Firm* — Sterne, Kessler, Goldstein & Fox PLLC

(57) ABSTRACT

A wireless communication device is disclosed that is capable of performing efficient network searching. Specifically, by utilizing its location information and accessing stored cell information, the device can streamline searching. Further, if a full search is to be performed, the device receives information from multiple radio access technologies together, and processes the received information digitally in order to search the individual radio access technologies. In addition, the device is capable of performing efficient 4G searches by setting its RF module to capture information of multiple raster points simultaneously within a search band, and shifting the search band so as not to duplicatively search raster points.

20 Claims, 9 Drawing Sheets

WIRELESS COMMUNICATION DEVICE CAPABLE OF EFFICIENT NETWORK SEARCH

CROSS-REFERENCE TO RELATED APPLICATIONS

This Patent application claims the benefit of U.S. Provisional Patent Application No. 61/562,196, filed Nov. 21, 2011, entitled "Fourth Generation (4G) Communication System."

BACKGROUND

1. Field of Invention

The invention relates to wireless communications, and more specifically to a wireless communication device that is capable of efficiently searching a wireless communication network.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

During communication with a current base station, or prior to such communication, wireless communication devices repeatedly search for available base stations within the wireless communication network. This may be performed in order to establish an initial connection, or to determine whether a handoff should be initiated, as well as for many other reasons.

The search performed by conventional wireless communication devices is extremely cumbersome and time-consuming. Such devices typically search all frequency bands in a set order in search of viable base stations. However, because the search is performed without any specifically-tailored starting point, and without any organization, the search wastes significant time and relies on luck for finding base stations early in the procedure.

Consequently, there is a need for a wireless communication device capable of efficiently searching a wireless communication network. Further aspects and advantages of the invention will become apparent from the detailed description that follows.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
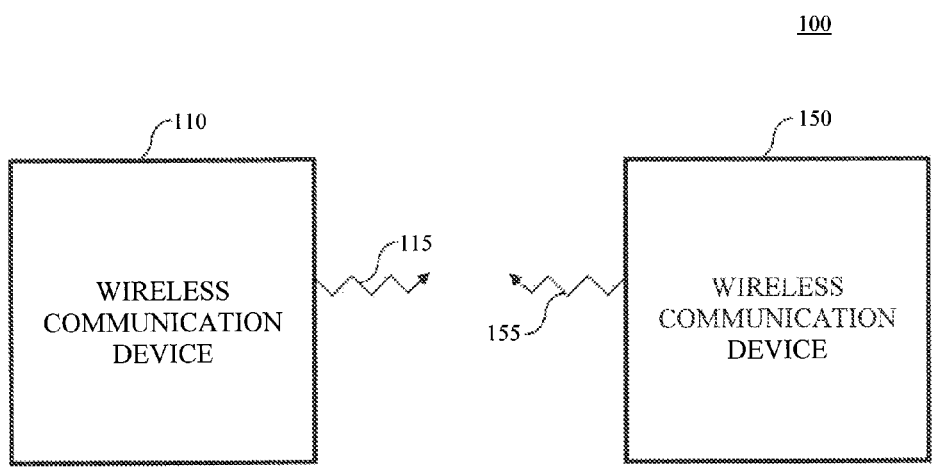
FIG. 1 illustrates a block diagram of a wireless communication environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, stricture, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments of the disclosure may be implemented in hardware (e.g., circuits), firmware, software, or any combination thereof. Embodiments of the disclosure may also be implemented as instructions stored on a machine-readable medium, which may be read and executed by one or more processors. A machine-readable medium may include any tangible mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Wireless Communications Environment

FIG. 1 illustrates a block diagram of a wireless communication environment 100 according to an exemplary embodiment of the disclosure. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a first wireless communication device 110 and a second wireless communication device 150. The first wireless communication device 110 may represent an exemplary embodiment of a user equipment and the second wireless communication device 150 may represent an exemplary embodiment of a second user equipment or a base station within a cellular communications network.

The first wireless communication device 110 transmits a first wireless signal 115 toward the second wireless communication device 150 using any acceptable modulation scheme. The second wireless communication device 150 receives the first wireless signal 115. The second wireless communication device 150 processes the received first communication signal and, if necessary, transmits a second wireless signal 155 back to the first wireless communication device 110. In this manner, the first wireless communication device 110 and the second wireless communication device 150 exchange information ("communicate") with one another.

An Exemplary Wireless Communication Device

Figure 2A:
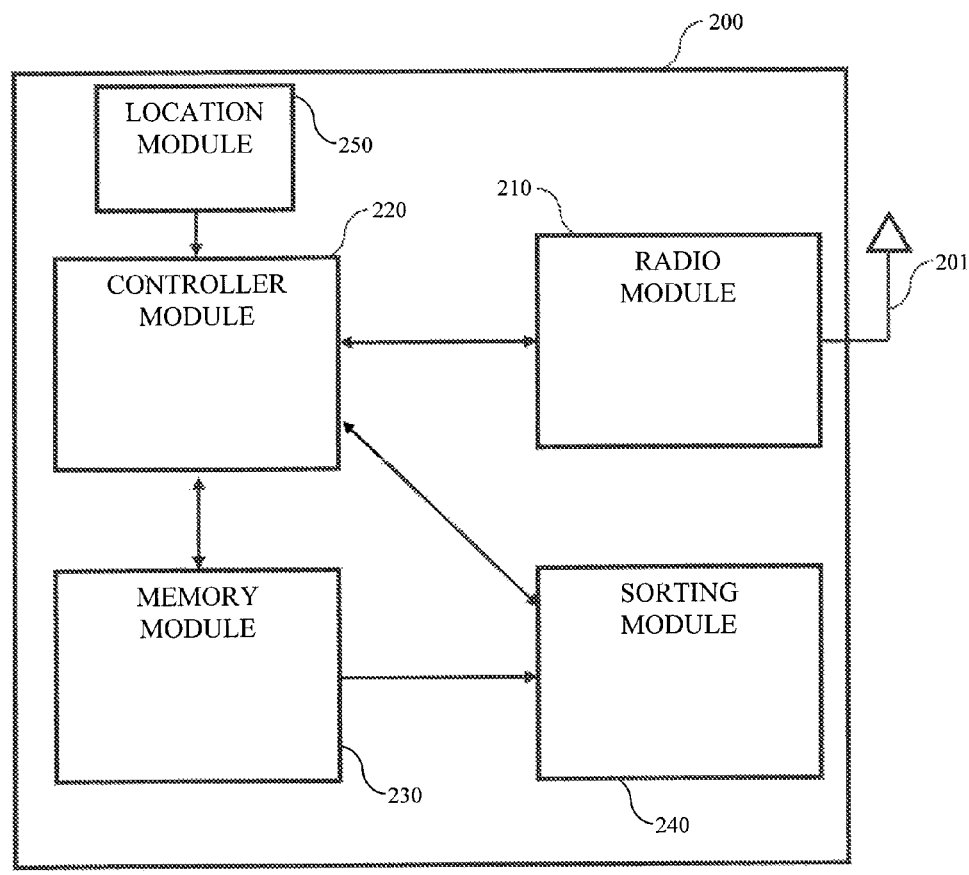
FIG. 2A illustrates a block diagram of a wireless communication device that is implemented as part of the wireless communication environment.

FIG. 2A illustrates a block diagram of a wireless communication device 200 that is implemented as part of the wireless communication environment 100 according to an exemplary embodiment of the invention. The wireless communication device 200 includes a radio module 210 and a memory module 230, and may represent an exemplary embodiment of the first wireless communication device 110 or the second wireless communication device 150.

The wireless communication device 200 includes a controller module 220 that performs most of the functions within the wireless communication device 200, including background processing, signal processing, and control. The controller module 220 is connected to each of the radio module 210 and the memory module 230. The radio module 210 receives signals from, and transmits signals to, the wireless communication environment 100 via an antenna 201. The radio module 210 may include one or more receiver chains for receiving and front-end processing signals.

Upon receipt of signals from the wireless communication environment 100, the radio module 210 performs front-end processing on the received signals and forwards the received signals to the controller module 220. The front-end processing may include demodulation, decoding and analog-to-digital conversion, among other processings. The controller module 220 may also control the operation of, and generate signals for transmission by, the radio module 210.

While in operation, the controller module 220 stores viable cell information in the memory module 230 for later use. The viable cell information may be obtained from actual cells to which the wireless communication device 200 is or has been connected or may be obtained from network searches, or in any other manner within the spirit and scope of the present disclosure. The viable cell information should at least include cell location, as well as any other information that may be needed for future searching, such as cell range, cell RAT (radio access technology) capabilities, etc.

The wireless communication device 200 further includes a sorting module 240 and a location module 250, which are both utilized during network searches, and whose functions will be discussed in detail below.

Optimized Network Search Based on Stored Information

Occasionally, the controller module 220 controls the wireless communication device 200 to perform a network search for nearby base stations. When the controller module 220 initiates the network search, the controller module 220 also retrieves a current location of the wireless communication device 200 from the location module 250. The location module may be a GPS (global positioning system) receiver unit, or any other device capable of determine with relative accuracy the position of the wireless communication device.

Location Information Available

Once the controller module 220 obtains the location information from the location module 250, the controller module 220 searches the memory module 230 for stored cells that fall within the vicinity of the received location (whose distance from the wireless communication device does not exceed a predetermined threshold). These cells can be identified based on their corresponding positions, which were stored along with their identification information. The controller module 220 determines how many cells fall within the location parameters are stored in the memory module 230.

If the controller module 220 determines that there are no stored cells falling within the vicinity of the received location, the controller module 220 initiates a full network search (discussed below). Alternatively, if the controller module 220 determines that there is only one stored cell that falls within the vicinity of the received location, the controller module 220 selects the cell and proceeds to test the cell for usability. If the cell is not found on the stored center frequency, the controller module 220 preferably causes the radio module 210 to search for the existence of any other cell located on the selected center frequency and/or radio access technology (RAT) before exiting the selected frequency.

Alternatively, if the controller module 220 determines that there is more than one cell stored in the memory module 230 that fall within the vicinity of the received location, the controller module 220 causes the sorting module 240 to perform a sorting operation on the plurality of cells.

The sorting module 240 retrieves the cell information identified by the controller module 220 (the cells falling within the vicinity of the current location). The sorting module 240 then reviews several pieces of information stored in the memory module 230 in association with those cells. For example, the sorting module 240 may review, with respect to each cell, the actual distance from the cell to the current location, the last time the cell was used, average RSRP (reference signal received power), average RSRQ (reference signal received quality), RAT capabilities, and/or QoS (quality of service) parameters of the cell.

From this information, the sorting module 240 sorts the viable cells, with the cell determined to be the best candidate for selection at the top of the order, and the cell determined to be the worst candidate for selection at the bottom of the order. For example, a cell located very close to the current device location that was very recently used will be located higher in the sorted list of cells than a cell located further away from the current location that has not yet been used.

Once the sorting module 240 completes the sorting operation, the sorting module 240 sends the sorted cell list to the controller module 220. The controller module 220 then retrieves the information (e.g. frequency) from the memory module 230 associated with the first cell in the sorted cell list. The controller module 220 then causes the radio module 210 to tune to the frequency associated with the selected cell and proceeds to test and measure the selected cell for viability. The cell may be found to be inadequate for numerous reasons, including that the cell ID of the selected cell cannot be found, the cell is overburdened, the cell exhibits poor connection quality, etc.

If the controller module 220 determines the first cell of the list to be inadequate (for any of the reasons discussed above), the controller module 220 repeats the testing and measuring procedures for subsequent cells in the list until an acceptable cell is discovered. If the controller module 220 traverses the entire sorted list without finding an acceptable cell, the controller module 220 initiates a full network search (discussed below).

Location Information Unavailable

There may be circumstances in which the controller module 220 is unable to acquire the location information of the wireless communication device 200. For example, the location module 250 may be malfunctioning, may be absent from the wireless communication device 200, or may be unable to currently determine a location (e.g., unable to connect to GPS satellites). In this circumstance, the controller module 220 controls the sorting module 240 to perform a sorting operation on all cells stored in the memory module 230.

After receiving the request, the sorting module 240 accesses the cell information for all the cells stored in the memory module 230. The sorting module 240 then performs a sorting operation on the stored cells, giving extra weight to how recently the stored cell was used. Specifically, because there is no location information, the sorting module 240 presumes that cells recently used are more likely to be within the vicinity of the wireless communication device 200 than cells used further in the past.

Once the sorting module 240 has generated its sorted list of cells, the controller module 220 proceeds to tune the radio module 210 to the first cell for testing and measuring. As discussed above, the controller module 220 cycles through the sorted list of cells until an acceptable cell is discovered. If no acceptable cell is discovered from among the stored cells, the controller module 220 initiates a full network search (discussed below).

Those skilled in the relevant art(s) will recognize that many modifications may be available to the above configurations within the spirit and scope of the present invention. For example, the sorting module 240 may sort the stored cells based on more or fewer factors than those listed. In addition, when the search for the first listed cell fails, the controller module 220 may search for cells located at or near the same center frequency before moving to the next cell on the sorted list. In this manner, the controller module 220 avoids having to retune the radio module 210, which is a particularly time-consuming operation.

Full Network Search with Coordinated Multi-Rat Support

As discussed above, there may be numerous scenarios in which the controller module 220 initiates a full network search. Provided that the wireless communication device 200 is capable of communicating over multiple different RATs (e.g., 2G, 3G, 4G, etc.) the full network search preferably includes a search of each RAT. In typical wireless communication devices, each RAT is searched individually frequency-by-frequency, which is an extremely long process. However, according to a present embodiment, the wireless communication device 200 can simultaneously search all RATs.

Figure 2B:
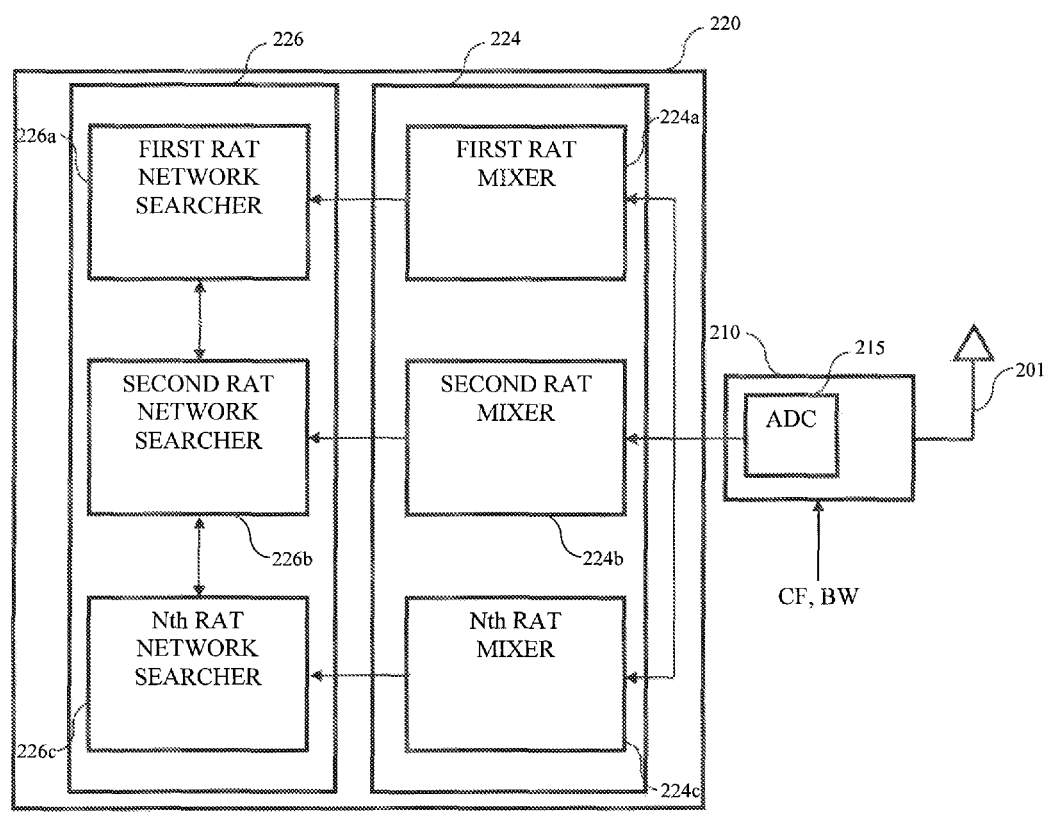
FIG. 2B illustrates a block diagram of portions of a radio module and a controller module that may be implemented within the wireless communication device.

FIG. 2B illustrates a block diagram of an exemplary configuration of the radio module 210 and the controller module 220 that may be incorporated within the wireless communication device 200. The radio module 210 includes an analog-to-digital converter 215. The controller module 220 includes a mixing module 224 having mixers 224a-c, and a searching module 226 that includes RAT searchers 226a-c.

When the controller module 220 initiates a full network search, the controller module 220 sets a center frequency CF and a bandwidth BW for the radio module 210. Preferably, the center frequency and bandwidth are set so as to encompass all available RATs. Provided that the center frequency and bandwidth are set to capture multiple RATs, signals from all the RATs are received by the antenna 201 in analog form. The radio module 210 receives the analog signals from the antenna 201. The ADC 215 then converts the received analog signals to digital form and sends the digital signals to the mixing module 224 of the controller module 220.

From the received signals, the wireless communication device 200 then searches for a base station. This can be performed for each of multiple RATs in different ways. In a first example, the wireless communication device 200 is not aware in advance of the center frequencies on which the different RATs communicate. In this case, the wireless communication device 200 can attempt to process all RATs simultaneously. Specifically, the wireless communication device 200 sets a bandwidth of the radio module 210 sufficient to cover synchronization signals from all RATs. For example, if $BW_1$, $BW_2$, and $BW_3$ are the minimum bandwidths required for each RAT synchronization, respectively, then the wireless communication device 200 sets the bandwidth of the radio module 210 to be the maximum of $BW_1$, $BW_2$, and $BW_3$. Mixing and filtering of the received signals can then be performed as required for each of the RATs.

In a second example, the wireless communication device sets the bandwidth of the radio module 210 sufficient to be much wider than the synchronization signal and can choose any RAT or center frequency that falls within the set bandwidth. The bandwidth may be limited by capabilities of the radio module 210, such as the ability of the radio module 210 to distinguish between weak signals in the presence of strong signals of an adjacent band.

For example, the digital signals are sent to each of a first RAT mixer 224a, a second RAT mixer 224b, and an Nth RAT mixer 224c. Each of the RAT mixers 224a-c performs mixing and filtering operations on the received digital signals in order to extract information contained within its corresponding RAT. For example, 2G, 3G, and 4G RATs typically operate at 740 MHz, 760 MHz, and 720 MHz, respectively. Therefore, the first RAT mixer 224a (set to extract 2G information) needs only to bandpass filter the central frequencies from the remaining frequencies (presuming that the center frequency of the radio module 210 was set to be near the 2G center frequency). On the other hand, the second RAT mixer 224b (set to extract 3G information) first performs digital mixing to downconvert the received digital signals to center frequency and then performs high-pass filtering to extract the 3G information. Similarly, the Nth RAT mixer 224c (set to extract 4G information) digitally mixes to upconvert the received digital signals and then performs low-pass filtering to extract the 4G information.

Once the individual RAT informations have been extracted from the received digital signals, the results are forwarded to corresponding RAT searchers 226a-c located within the searching module 226. The respective RAT searchers perform network search operations on their corresponding RATs based on the received RAT information from the mixing module 224 in order to locate and connect with a viable cell.

In addition, the RATs can be searched in any order, as desired, and information obtained during an earlier RAT search can be employed to aid a future RAT search. Such information for sharing may include frequency offset of earlier network search, advertised neighbor frequency and cell IDs (if available), location information of nearby cells, as well as other useful information. Through the sharing of such information, the search of later RATs can be expedited, which further improves efficiency of searching.

Those skilled in the relevant art(s) will recognize that many modifications may be available for the configuration discussed herein. For example, although the configuration has been described with respect to three RATs, more or fewer may be searched in a similar manner as described above. In addition, the order of the searching may be altered in accordance with the application, or all RATs may be simultaneously searched if the wireless communication device 200 has sufficient hardware and processing capabilities to do so.

A Configuration for Efficient 4G Searching

As discussed above, once the RAT information for each of the RATs has been extracted, the wireless communication device 200 can then perform a network search procedure for each RAT in order to identify viable cells. When searching a 4G RAT, the wireless communication device 200 can be configured to perform an efficient search in order to even further reduce connection latency.

Broad Base Station Search within Frequency Band

Figure 3:
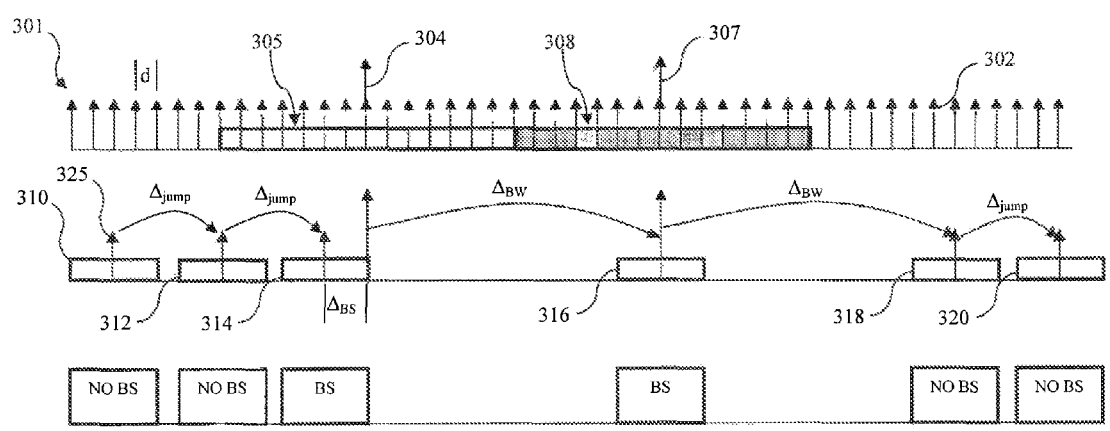
FIG. 3 illustrates a diagram of a frequency band searched by the wireless communication device.

FIG. 3 illustrates a 4 G communication band 301 searched by the wireless communication device 200 according to an exemplary embodiment of the present disclosure.

The 4G frequency band 301 includes a plurality of raster points 302 spaced evenly apart from one another by a frequency separation d. In 4G, the frequency separation between adjacent raster points 302 is typically 100 kHz. The raster points 302 constitute frequencies within the 4G band 301 to which a radio module can tune in order to search for available base stations.

The exemplary 4G frequency band 301 of FIG. 3 includes a first base station 304 having a center frequency located approximately at the similarly-located raster point 302 and having a frequency range 305 illustrated by the light grey box. The 4G frequency band 301 also includes a second base station 307 having a center frequency located approximately at the similarly-located raster point 302 and having a frequency range 308 illustrated by the dark grey box.

Typical wireless communication devices search the 4G network by tuning consecutively to each raster point 302, and searching each individual raster point 302 for the presence of a base station. However, searching in this manner performs numerous duplicate operations, and tails to account for the low likelihood of finding a second base station within the frequency range of a first base station.

Therefore, the wireless communication device 200 is configured to streamline the 4G searching procedure. In particular, the controller module 220 sets a bandwidth of the radio module 210 to be as wide as possible to capture as many raster points 302 as possible. However, the bandwidth will be limited by noise and interference, and therefore should be set only as large as will provide accurate readings of the multiple raster points 302 contained within a single search band. In the exemplary embodiment of FIG. 3, the controller module sets a bandwidth of the radio module 210 to 500 kHz (corresponding to 5 raster points and synchronization signal of any of the 5 raster points) as illustrated by search bands 310-320.

The controller module 220 then sets the initial center frequency of the radio module 210 so as to capture a first raster point 302 within the 4G frequency band 301 based on the previously-set bandwidth. In the exemplary embodiment of FIG. 3, because the bandwidth has been set to 500 kHz, the controller module 220 sets the initial center frequency 325 to 200 kHz (200 kHz higher than the base of the 4G frequency band 301).

Once the initial search band 310 has been set, the radio module 210 receives signals located within the search band 310 and performs front end processing on the signals. The controller module 220 then analyzes the signals for the presence of a base station. This may be performed by searching for a PSS (primary synchronization signal) located on any of the raster point frequencies.

As shown in FIG. 3, there is no base station located within the initial search band 310. Consequently, the controller module 220 sets a new center frequency in the radio module 210 to search a subsequent set of raster points. However, because it is not necessary to re-search raster points encompassed by the initial search band 310, the controller module 210 does not shift the center frequency of the radio module 210 by a single raster point 302, but rather shifts the center frequency by $\Delta_{jump}$.

$\Delta_{jump}$ is preferably set so that a subsequent search band will encompass the raster points 302 that immediately follow the previous search band. As such, $\Delta_{jump}$ can simply be set equal to the bandwidth of the radio module 210, 500 kHz in the exemplary embodiment of FIG. 3. However, the value of $\Delta_{jump}$ may be set to a value different from the bandwidth of the radio module as a particular application may require, and may be set to cause a subsequent search band to overlap with a previous search band, or to be separated from the previous search band by one or more raster points 302.

After shifting the center frequency of the radio module 210, the controller module 220 again does not find a base station located within the search band 312, and therefore shifts the center frequency of the radio module 210 again by $\Delta_{jump}$. After receiving and processing signals found within the search band 314, the controller module 220 discovers a base station 304 centered at a raster point located at the right-most edge of the search band 314 based on a decoded PSS signal transmitted by the base station 304.

Having located the base station 304, the controller module 220 performs additional processing on the base station 304 to pinpoint its center frequency (discussed below), and to obtain various parameters associated with the base station 304.

Once the controller module 220 has processed the base station 304, the controller module 220 again shifts the center frequency of the radio module 210 in order to continue the search of the 4G frequency band 301. However, the controller module 220 presumes that another base station located in the 4G frequency band 301 will not have a frequency range that overlaps with the frequency range of the found base station 304. Therefore, the controller module 220 does not shift the center frequency by $\Delta_{jump}$, as doing so would cause the radio module 210 to search raster points unlikely to have a base station. Therefore, the controller module 220 instead shifts ller module is configured to detect the presence $_{or}$ from the raster point containing the base station 304.

The controller module 220 should set $\Delta_{BW}$ equal to a bandwidth of base stations within the 4G frequency band. For example, assuming that any subsequent base station will include the same bandwidth as the base station 304, the controller module 220 can set $\Delta_{BW}$ to be equal to the bandwidth of the base station 304. Alternatively, assuming that all base stations will at least have the minimum bandwidth as set by the 4G standard (i.e., 1.4 MHz), the controller module 220 can set $\Delta_{BW}$ to be equal to the minimum bandwidth. In addition, because the controller module 220 may acquire multiple different possible bandwidths of base stations, the controller module 220 can set $\Delta_{BW}$ according to the following equation:

$$\Delta_{BW} = \max\left(\frac{BW_{found} + BW_{min}}{2}, BW_{min}, BW_{given}\right), \quad (1)$$

where $BW_{found}$ corresponds to the bandwidth found from broadcast information corresponding to the found base station, $BW_{given}$ corresponds to bandwidth information given by the higher layer prior to starting the network search, and $BW_{min}$ corresponds to the minimum bandwidth as set by the 4G standard (1.4 MHz).

In the exemplary embodiment of FIG. 3, the controller module 220 determines $\Delta_{BW}$ to be 1.4 MHz (either based on the bandwidth of the base station 304, or the minimum bandwidth). Consequently, the controller module 220 shifts the center frequency of the radio module by the calculated $\Delta_{BW}$ and the difference from the current center frequency to the center frequency of the base station 304. In other words, the controller module 220 shifts the center frequency of the radio module 210 according to the following equation:

$$CF_{new} = CF_{old} + \Delta_{BS} + \Delta_{BW}, \quad (2)$$

where $CF_{new}$ corresponds to the new center frequency of the radio module 210, $CF_{old}$ corresponds to the old center frequency of the radio module 210, and $\Delta_{BS}$ equals the difference from the old center frequency of the radio module 210 to the detected center frequency of the base station.

In the exemplary embodiment of FIG. 3, after shifting the center frequency of the radio module 210, the controller module 220 again finds a base station 307 within the search band 316. Consequently, the controller module 220 performs additional processing on the base station 307 and then shifts the center frequency of the radio module 210 according to equation (2), above. In the search band 318, the controller module 220 does not find a base station, and therefore shifts the center frequency of the radio module 210 by $\Delta_{jump}$ so as to set a new search band 320. The controller module 220 and the radio module 210 continue in this manner until an end of the 4G frequency band is reached.

Using this configuration, the wireless communication device 200 does not search each raster point 302 individually, as is conventional. Instead, the wireless communication device is capable of searching groups of raster points simultaneously and skipping raster points which are unlikely to contain a base station. As such, this configuration significantly reduces time spent searching the 4G frequency band.

Those skilled in the relevant art(s) will recognize that many modifications may be available to the configuration discussed above within the spirit and scope of the present disclosure. For example, $\Delta_{BW}$ may be set so as to place the predicted nearest location of a subsequent base station at a left-most edge of the next search band in order to even quicker progress along the 4G frequency band. In addition, rather than searching the entire band 301, the controller module 220 may be configured to stop the search once an acceptable base station, or a base station that meets certain criteria, has been discovered.

Narrow Base Station Search and Center Frequency Pin-Pointing

As discussed above, once a base station has been discovered within a search band, the controller module 220 must perform additional processing. Specifically, because the raster points maintain a separation (100 kHz in the example) that is different from the sub carrier separation associated with the base station (e.g., 15 kHz in LTE), the controller module 220 must perform additional processing to determine the exact center frequency and local oscillator frequency of the base station. In addition, because the local oscillator of the radio module 210 may not oscillate precisely with the same frequency as that of the base station, it may also be necessary to synchronize the oscillation frequencies of the base station and the wireless communication device.

Figure 4:
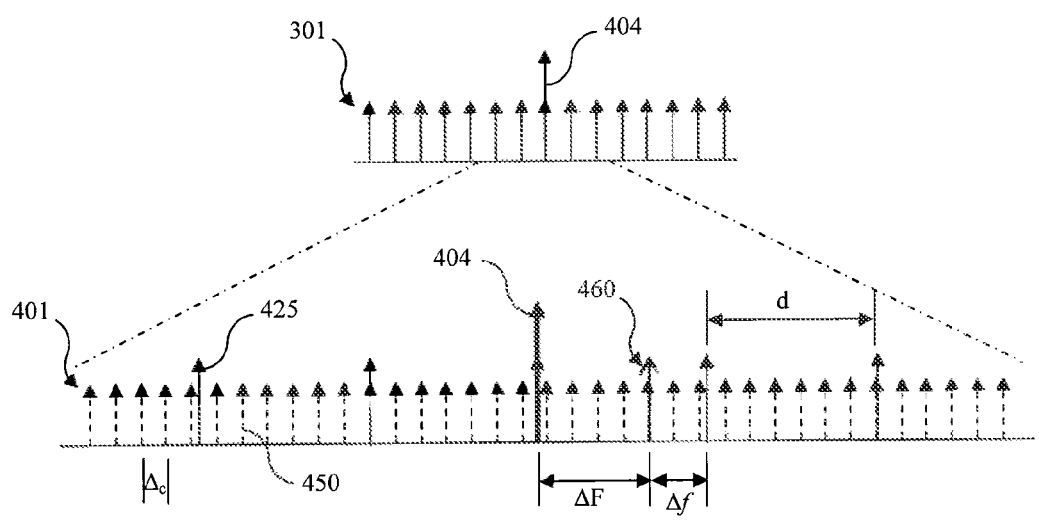
FIG. 4 illustrates a magnified diagram of a portion of the frequency band searched by the wireless communication device.

FIG. 4 illustrates a magnified diagram of a portion 401 of the frequency band 301 searched by the wireless communication device 200 according to an exemplary embodiment of the disclosure.

In the portion 401 of the frequency band 301, a plurality of OFDM (orthogonal frequency division multiplexing) sub carriers 450 associated with the base station are uniformly distributed within the portion 401, and are separated from one another by a distance $\Delta_c$. The sub carrier separation $\Delta_c$ remains constant within the portion 401, but may vary among radio access technologies. For purposes of this discussion, $\Delta_c$ is 15 kHz, in accordance with LTE standards.

In the portion 401 of the frequency band 301, the raster points 425 are separated by a distance d=100 kHz and these raster points are according to receiver module's frequency reference. The radio module 210 has its center frequency 404 tuned to one of the raster points 401 within the portion, whereas the base station has a carrier frequency 460 located some frequency $\Delta F$ away from the center frequency 404 of the radio module 210 and a frequency $\Delta f$ away from a nearest raster point 401.

In order to determine the various parameters of the base station, the wireless communication device 200 first determines the frequency offset of the base station with respect to the center frequency of the radio module 210. Specifically, the controller module 220 determines a fractional frequency offset ($\theta_{FFO}$) and an integer frequency offset ($IFO_{PASS}$), where $\Delta F = IFO_{PASS} + \theta_{FFO}$.

The wireless communication device 200 obtains the fractional frequency $\theta_{FFO}$ using the well-known CP (cyclic prefix) correlation method. However, the integer frequency offset $IFO_{PASS}$ cannot be obtained in this manner. Therefore, the controller module 220 must hypothesize the integer frequency offset $IFO_{PASS}$.

In order to obtain the integer frequency offset $IFO_{PASS}$, the controller module first generates a list of OFDM sub carrier positions with respect to the tuned center frequency of the receiver module 210 that correspond to each raster point 425 along with maximum frequency uncertainty of receiver module within the search band 301, with respect to the center raster point (corresponding to the receiver carrier frequency). The controller module 220 then determines the integer frequency offset $IFO_{PASS}$ by determining at which of the listed OFDM sub carrier positions the cell is detected.

For example, in the example of FIG. 4, the controller module 220 first generates a raster index relative to the center raster point, using the following equation:

$$rsidx = -\left\lfloor \frac{\Delta_{jump}}{2*\Delta_{raster}} \right\rfloor : \left\lfloor \frac{\Delta_{jump}}{2*\Delta_{raster}} \right\rfloor, \quad (3)$$

where $\Delta_{raster}$ is the frequency spacing between adjacent raster points (e.g., 100 kHz). Using equation (3), the raster index generated for the example of FIG. 4 will be [−2, −1, 0, 1, 2], indicative of the five raster values contained within the search band.

Based on the generated raster index, the list of carrier positions relative to the center raster point can then be determined by applying the following equation to each of the values within the raster index rsidx:

$$crlist = \text{round}\left(rsidx(i) * \frac{\Delta_{raster}}{\Delta_c}\right). \quad (4)$$

Applying equation (4) to the above rsidx gives crlist=[−13, −7, 0, 7, 13] for the above example, which corresponds to the carrier positions relative to the center raster point at which the base station may be centered is generated. The controller module 220 then searches each one of the carriers corresponding to the positions within the crlist for the base station, and sets the carrier position corresponding to the location of the base station as the integer frequency offset $IFO_{PASS}$. In the example of FIG. 4, $IFO_{PASS}$ will be 7 corresponding to the carrier position of the raster point closest to the carrier 460 of the base station.

Once the fractional frequency offset $\theta_{FFO}$ and the integer frequency offset $IFO_{PASS}$ have been determined, the controller module 220 can then determine the raster point index of the base station ($RP_{BS}$) and the radio module clock correction factor ($\epsilon_{ppm}$), as follows:

$$RP_{BS} = \text{round}\left(IFO_{PASS} * \frac{\Delta_c}{\Delta_{raster}}\right), \text{ and} \quad (5)$$

$$\varepsilon_{ppm} = \frac{\Delta f * \Delta c}{RFF_{req}}, \quad (6)$$

where RFFreq corresponds to the current center frequency of the radio module 210 in MHz. It should be noted that equation (5) can be modified to account for oscillator instability. In particular, if the oscillator instability causes a frequency offset of $\Delta_{FOMax}$ in terms of normalized frequency relative to OFDM sub-carrier spacing, then equation (5) can be modified to round $(IFO_{PASS}*\Delta_c/\Delta_{raster})-\Delta_{FOMax}$, and $(IFO_{PASS}*\Delta_c/\Delta_{raster})+\Delta_{FOMax}$. In this manner, oscillator instability can be accounted for.

Because $IFO_{PASS}$ has already been determined, the raster point index of the base station $RP_{BS}$ can be immediately determined using equation (5). However, because equation (6) relies on $\Delta f$ to calculate the radio module clock correction factor $\epsilon_{ppm}$, the controller module 220 must first calculate $\Delta f$. This can be done by applying the determined fractional frequency offset $\theta_{FFO}$, the integer frequency offset $IFO_{PASS}$, and the calculated raster point index of the base station $RP_{BS}$ to the following equations:

$$\Delta f = f_{IFO} + \phi_{FFO}, \quad (7)$$

$$\text{where } f_{IFO} = \text{round}\left(\frac{(IFO_{PASS} + \theta_{FFO})*\Delta_c - \Delta_{raster}*RP_{BS}}{\Delta_c}\right), \text{ and} \quad (8)$$

$$\phi_{FFO} = \text{round}\left(\frac{(IFO_{PASS} + \theta_{FFO})*\Delta_c - \Delta_{raster}*RP_{BS}}{\Delta_c}\right) - f_{IFO}. \quad (9)$$

By solving equation (7) based on equations (8) and (9), the radio module clock correction factor $\epsilon_{ppm}$ can be determined based on equation (6). Once the radio module clock correction factor $\epsilon_{ppm}$ has been calculated, the controller module 220 can then calculate a updated center frequency and clock frequency for the radio module 210, as follows:

$$RFFreq_{updated} = RFFreq*(1+\epsilon_{ppm}*1e^{-6}) \quad (10)$$

$$ClockFreq_{updated} = ClockFreq*(1+\epsilon_{ppm}*1e^{-6}), \quad (11)$$

where RFFreq$_{updated}$ is the updated center frequency of the radio module 210 in MHz, ClockFreq is the current clock frequency of the radio module 210, and ClockFreq$_{updated}$ is the updated clock frequency in MHz.

Using the above equations, the wireless communication device 200 is able to pinpoint the center frequency of a base station found with a search band, and can adjust the settings of its radio module 210.

Figure 5:
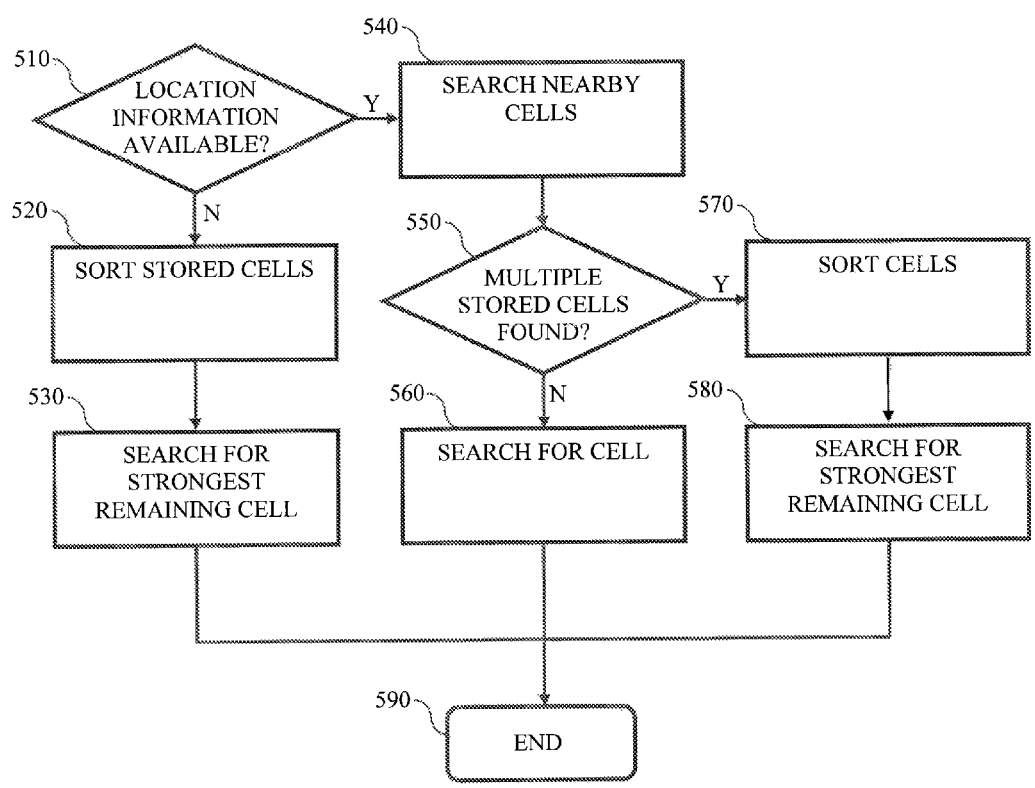
FIG. 5 illustrates a block diagram of a method of performing an optimized network search based on stored cell information that may be implemented by the wireless communication device.

Exemplary Method for Performing a Network Search Based on Stored Cell Information FIG. 5 illustrates a block diagram of a method of performing an optimized network search based on stored cell information that may be implemented by the wireless communication device according to an exemplary embodiment of the disclosure.

The method begins with the wireless communication device making a determination as to whether location information is available (510). If no location information of the wireless communication device is available, the wireless communication device sorts all cells stored within a memory of the wireless communication device (520). The sorting may be performed based on one or more of estimated distance from the cell to the wireless communication device, the last time the cell was used, average RSRP (reference signal received power), average RSRQ (reference signal received quality), RAT capabilities, and/or QoS (quality of service) parameters of the cell.

Once the cells have been sorted, the wireless communication device searches each of the cells in sorted order until a viable cell is found. Once a cell is found, the method ends (590).

If, on the other hand, the wireless communication device determines that location information is available (510), the wireless communication device then scans its memory for cells that are within a vicinity of the location information (540). If the memory scan reveals only a single stored cell within the vicinity of the location (550), then the wireless communication device selects and searches the stored cell (560). The method then ends (590).

If, on the other hand, the memory scan reveals multiple stored cells within the vicinity of the location (550), the wireless communication device then proceeds to sort the cells identified as being within the vicinity of the location (570). Once sorted, the wireless communication device searches each cell in sorted order until a viable cell is found (580). Once a cell is found, the method ends (590).

If, while performing the method, the wireless communication device determines that there are no stored cells, or determines that there are no viable cells among the stored cells, the wireless communication device initiates a full search, as discussed below.

Figure 6:
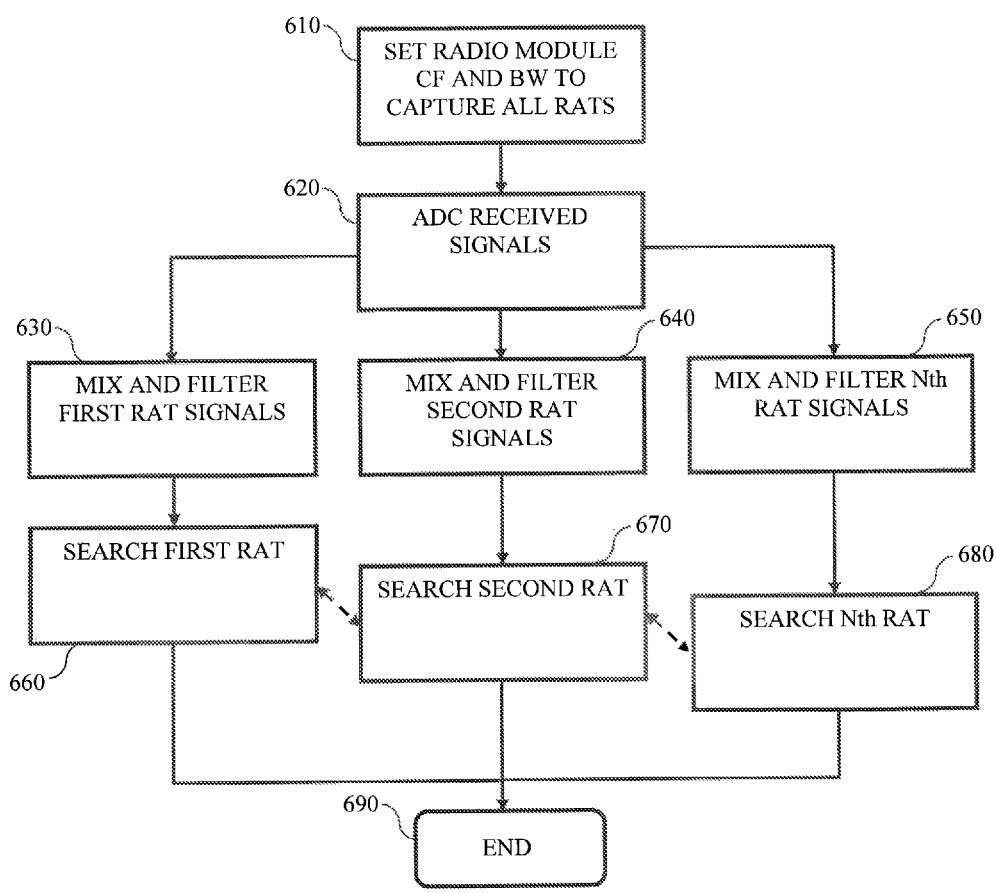
FIG. 6 illustrates a block diagram of a method for performing a multi-RAT network search that may be implemented by the wireless communication device.

Exemplary Method for Performing Full Network Search with Coordinated Multi-Rat Support FIG. 6 illustrates a block diagram of a method for performing a multi-RAT network search that may be implemented by the wireless communication device according to an exemplary embodiment of the present invention.

The method begins with the wireless communication device setting its radio module to have a center frequency CF and bandwidth BW. As discussed above, the bandwidth may be set in any one of multiple different ways so as to capture the various RATs (610). Once the radio module has been set, the wireless communication device converts signals received within the search band from analog to digital signal (620).

Once the signals are in digital format, the wireless communication device extracts the signals from each RAT via digitally mixing and filtering the digital signals (630-650).

Once each of the individual RAT's signals has been extracted, the wireless communication device then searches each individual RAT based on the extracted information (660-680). In order to even further streamline searching of the individual RATs, the wireless communication device can use information obtained during the search of one or more earlier-searched RATs to aid the search of the current RAT. Such information may include frequency offset, advertised neighbor frequency and cell IDs, location information, etc. The RATs can be searched in this manner until one or more viable cells have been discovered, at which point the method ends (690).

Figure 7:
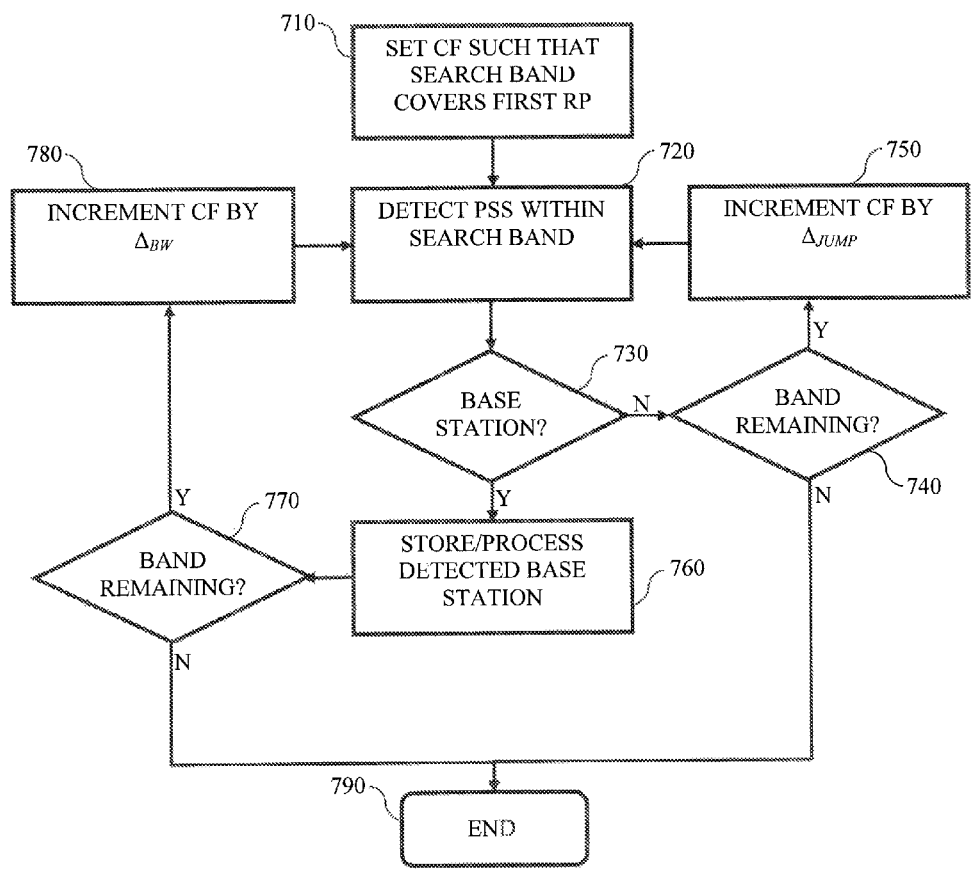
FIG. 7 illustrates a block diagram of a method for locating base stations within a frequency band that may be implemented by the wireless communication device, according to an exemplary embodiment.

Exemplary Method for Performing Efficient 4G Base Station Search within Frequency Band FIG. 7 illustrates a block diagram of a method for locating 4G base stations within a frequency band that may be implemented by the wireless communication device according to an exemplary embodiment.

The method begins with the wireless communication device setting its radio module to have a center frequency and bandwidth so as to receive a search band at the start of the 4G frequency band (710). Once the search band has been set, the wireless communication detects whether a PSS (primary synchronization signal) is found within the search band (720). Based on detection of the PSS, the wireless communication device determines whether a base station is located within the search band (730).

If the wireless communication device determines that there is no base station within the search band (730), the wireless communication device determines whether any of the 4G band remains (740). In other words, the wireless communication device determines whether it has reached the end of the 4G band. If it has (740), the method ends (790). Alternatively, if it is determined that there is 4G band remaining (740), the wireless communication device increments the center frequency of its radio module by $\Delta_{jump}$ in order to create a new search band (750). The wireless communication device then repeats this process (720-750) until a base station is found (730) or the 4G band ends (740).

If the wireless communication device discovers a base station located within a search band (730), the wireless communication device stores information relating to the discovered base station and/or performs additional processing on the base station (760), as discussed in further detail below. The wireless communication device then determines whether 4G band remains (770). If no band remains, then the method ends (790). If band does remain, then the wireless communication device increments the center frequency of its radio module by $\Delta_{BW}$ (780) in order to generate a new search band. The wireless communication device repeats this process (720, 730, and 760-780) until the 4G band ends (770) or no base station is found within the search band (730).

Figure 8:
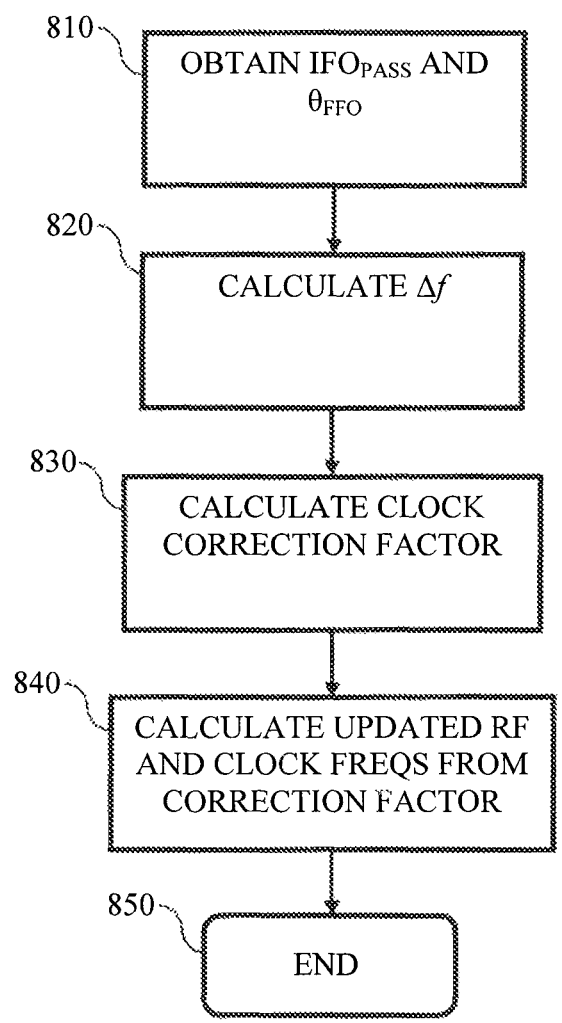
FIG. 8 illustrates a block diagram of a method for determining base station parameters and adjusting a radio module of the wireless communication device that may be implemented by the wireless communication device.

Exemplary Method for Determining Base Station Parameters and Adjusting Radio Module FIG. 8 illustrates a block diagram of a method for determining base station parameters and adjusting a radio module of the wireless communication device that may be implemented by the wireless communication device according to an exemplary embodiment of the present disclosure.

The method begins with the wireless communication device obtaining the fractional frequency offset $\theta_{FFO}$ and the integer frequency offset IFO$_{PASS}$ (810). The fractional frequency offset $\theta_{FFO}$ may be obtained using CP correlation, and the integer frequency offset IFO$_{PASS}$ may be obtained by determining the position of the center frequency of the base station relative to the radio module's center frequency.

Once the fractional frequency offset $\theta_{FFO}$ and the integer frequency offset $IFO_{PASS}$ have been calculated, the wireless communication device determines $\Delta f$ based on those values (820) using equations (7)-(9), above. Using the calculated $\Delta f$, the wireless communication device calculates a clock correction factor for the radio module (830) using equation (6), above, or some suitable variation thereof.

The wireless communication device then calculates an updated center frequency and an updated clock frequency for the radio module 840 using equations (10) and (11), above, or some suitable variation(s) thereof, after which the method ends (850).

Those skilled in the relevant art(s) will recognize that the methods described above with respect to FIGS. 6-8 can additionally or alternatively include any of the functionality of the wireless communication device 200 discussed above, and the above description of the exemplary method should neither be construed to limit the method nor the description of the wireless communication device 200.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication device capable of communicating within a Long-Term Evolution (LTE) wireless communication environment, the LTE wireless communication environment including a plurality of raster points uniformly distributed therein, the wireless communication device comprising:
    a radio module configured to receive signals from the LTE wireless communication environment; and
    a controller module configured to set a center frequency and a bandwidth of the radio module to define a search band, wherein the bandwidth of the search band is sufficiently large to encompass two or more adjacent raster points of the plurality of raster points, and to detect a presence or absence of a base station within the search band,
    wherein the controller module is configured to determine a raster point within the search band corresponding to a center frequency of the detected base station based on an integer frequency offset relative to the set center frequency of the radio module when the controller module detects the presence of the base station within the search band based on a primary synchronization signal associated with the base station, and
    wherein after determining the raster point corresponding to the center frequency of the detected base station, the controller module is configured to shift the center frequency of the radio module by a bandwidth shift frequency substantially equal to a bandwidth of the base station plus a difference between a previous center frequency of the radio module and the detected center frequency of the base station.

2. The wireless communication device of claim 1, wherein the controller module is configured to detect the presence or absence of the base station within the search band by detecting whether the primary synchronization signal associated with the base station is within the search band.

3. The wireless communication device of claim 1, wherein the controller module is further configured to shift the center frequency of the radio module by a jump shift frequency greater than a frequency spacing between adjacent raster points when the controller module detects the absence of the base station within the search band.

4. The wireless communication device of claim 3, wherein the jump shift frequency is equal to the bandwidth of the search band.

5. The wireless communication device of claim 3, wherein the jump shift frequency is less than the bandwidth of the search band.

6. The wireless communication device of claim 1, wherein the controller module is further configured to, calculate a frequency offset of the radio module relative to the base station when the controller module detects the presence of the base station within the search band.

7. The wireless communication device of claim 6, wherein the frequency offset includes a fractional frequency portion and an integer frequency portion.

8. The wireless communication device of claim 7, wherein the integer frequency portion is a representation of a number of orthogonal frequency-division multiplexing (OFDM) subcarriers between the center frequency of the radio module and a raster point nearest a center frequency of the base station.

9. The wireless communication device of claim 6, wherein the controller module is configured to update a clock frequency and a center frequency of the radio module based on the calculated frequency offset.

10. The wireless communication device of claim 1, wherein a frequency separation between adjacent raster points is 100 kHz.

11. The wireless communication device of claim 1, wherein the bandwidth of the search band set by the controller module is equal to a frequency spacing between a first raster point and a second raster point.

12. The wireless communication device of claim 1, wherein the bandwidth of the search band set by the controller module is 500 kHz.

13. The wireless communication device of claim 1, wherein the controller module is configured to initially set the center frequency of the search band to be equal to a raster point nearest a central frequency of the search band having a lowest frequency aligned with a first raster point in an LTE frequency band.

14. The wireless communication device of claim 1, wherein the controller module is configured to initially set the center frequency of the search band to be 200 kHz.

15. The wireless communication device of claim 1, wherein the bandwidth of the base station is acquired from the detected base station.

16. The wireless communication device of claim 1, wherein the bandwidth of the base station is assumed to be a minimum base station bandwidth as set by a corresponding communication standard.

17. The wireless communication device of claim 1, wherein the bandwidth of the base station is calculated from a found bandwidth acquired from the detected base station, and a minimum bandwidth defined by a corresponding communication standard.

18. The wireless communication device of claim 17, wherein the bandwidth of the base station is calculated by determining a maximum value from among the minimum bandwidth and an average of the minimum bandwidth and the found bandwidth.

19. The wireless communication device of claim 1, wherein after the controller module shifts the center frequency of the radio module by the bandwidth shift frequency, the controller module further shifts the center frequency of the radio module by a first number of raster points less than or equal to a second number of raster points that are encompassed by the bandwidth of the search band.

20. The wireless communication device of claim 19, wherein the first number of raster points is equal to a ceiling of the second number of raster points divided by 2.

* * * * *

UNITED STATES PATENT AND TRADEMARK OFFICE
CERTIFICATE OF CORRECTION

| | | |
|---|---|---|
| PATENT NO. | : 8,868,110 B2 | Page 1 of 1 |
| APPLICATION NO. | : 13/341627 | |
| DATED | : October 21, 2014 | |
| INVENTOR(S) | : Kumar Reddy et al. | |

It is certified that error appears in the above-identified patent and that said Letters Patent is hereby corrected as shown below:

In the Specification

Column 16, line 28, please replace "to, calculate" with --to calculate--.

Signed and Sealed this
Third Day of March, 2015

Michelle K. Lee
*Deputy Director of the United States Patent and Trademark Office*